Dec. 28, 1943.  J. M. HAIT  2,337,991
BOGIE WHEEL
Filed Jan. 19, 1942
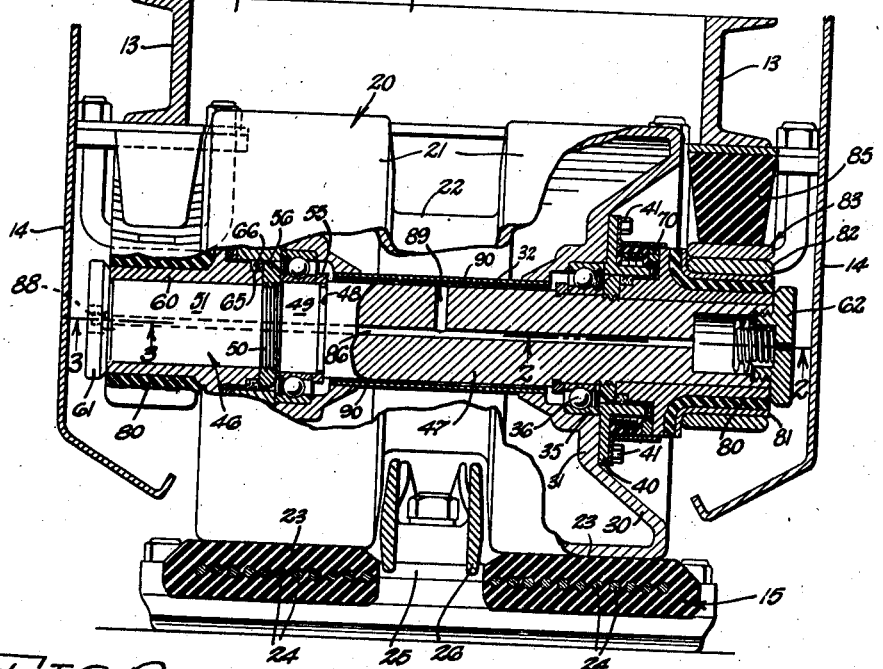
INVENTOR:
JAMES M. HAIT
BY
ATTORNEY Patented Dec. 28, 1943

2,337,991

UNITED STATES PATENT OFFICE 2,337,991

BOGIE WHEEL

James M. Hait, San Gabriel, Calif., assignor to Food Machinery Corporation, San Jose, Calif., a corporation of Delaware Application January 19, 1942, Serial No. 427,264

2 Claims. (Cl. 308—36.3)

This invention relates to track laying devices employed as the running gear of military tanks and particularly to the bogie wheels of such a device.

These track laying devices commonly employed on tanks include track forming belts, one on each side of the tank, which are trained around suitable idle and drive sprockets and a set of bogie wheels mounted on the tank, the bogie wheels traveling on tracks formed by the belts when the latter are resting on the ground. The term "belt" is here used generically as including chain belts, fabricated rubber and metal belts, or any other endless element adaptable for this purpose.

One of the problems involved in the construction of bogie wheels is the lubrication thereof. It is necessary for military tanks to operate under widely varying atmospheric conditions and under extreme conditions of flying abrasives, as in deserts, all with only very infrequent attention being paid to the lubrication of the bogie wheels.

It is an object of this invention to provide a bogie wheel construction which is capable of satisfactorily withstanding these difficult service conditions.

It is another object of the invention to provide a bogie wheel construction which is self-lubricating for long periods without attention under the adverse conditions stated.

It is often necessary for tanks, particularly those of the amphibian type, to travel with the bogie wheel submerged in water and sometimes to even stand for long periods with the wheels thus submerged. It is of extreme importance that bearings of the bogie wheels when operating under such conditions be protected from water seeping thereinto.

It is therefore another object of my invention to provide a bogie wheel construction which is proof against the admission of water into the bearings thereof when the bogie wheels are submerged.

The manner of accomplishing the foregoing objects, as well as further objects and advantages, will be made manifest in the following description taken in connection with the accompanying drawing in which:

Fig. 1 is a vertical axial sectional view of a prefered embodiment of the bogie wheel of my invention.

Fig. 2 is an enlarged detail sectional view taken on the line 2—2 of Fig. 1.

Fig. 3 is an enlarged sectional detail view taken on the line 3—3 of Fig. 1.

Fig. 4 is a diagrammatic sectional view of a bogie wheel axle illustrating a modified form of the invention.

Referring specifically to the drawing, a bogie wheel construction 10 is shown applied to a tank 11 having a frame 12 including channel bars 13, wheel guards 14 and suitable idle and drive sprockets (not shown) about which track forming belts 15 are trained and by which they are driven.

A series of the bogie wheel construction 10 is associated with each of the belts 15. Each bogie wheel construction 10 includes a wheel 20 including two hollow rollers 21 joined by a tubular neck 22, the rollers 21 resting on tracks 23 formed by the belt 15 when the latter is in contact with the ground. The belt 15 may be of any desired type but is here shown as having two endless bodies of rubber which form the tracks 23 and in which are imbedded endless cables 24 to which are clamped driving clamps 25. Provided on central portions of these clamps in articulating relation with each other is a series of guides 26 which extend upwardly into the space between the two rollers 21 of the wheel 20.

Each roller 20 has an outer end wall 30 which is dished inwardly to join with a hub 31, these hubs being joined centrally by a sleeve 32 which hermetically seals the space contained within the wheel 20. Each hub 31 has a central recess 35 for receiving a ball bearing 36. This bearing is held in place by a hub flange 40 secured to the hub 31 by capable screws 41. These screws also extend through the radial flange of an annular seal guard 43 so as to rigidly assemble this on the hub. The hub flange 40 has a tubular sleeve 44 extending axially outwardly from its inner edge.

Before both of the bearings 36 are assembled on the wheel 20 an axle 46 is inserted centrally through the wheel. At each end of a central portion 47 of this axle the latter is turned down to provide shoulders 48, a portion 49 which just fits within the inner race of the adjacent bearing 36, the outer end of this portion having threads 50, and a portion 51 of uniform diameter between the threads 50 and the adjacent end of the axle. Encircling each portion 49, between the adjacent shoulder 48 and bearing 36, is a metal ring 55, this ring and the inner race of the bearing 36 being clamped against the shoulder 48 by a ring nut 56 which is screwed on to the threads 50.

Slidably received on each portion 51 of the axle 46 is a thrust sleeve 60 which is held in place by one of two caps 61 and 62 screwed into threaded recesses 63 formed in the ends of the axle 46. The sleeve 60 is clamped against the ring nut 56 when this is assembled on the axle 46 and is provided with a recess 65 adjacent said nut 56 in which is placed a felt seal ring 66 which snugly engages the inner face of the hub flange sleeve 44. Encircling the sleeve 44, having a free sliding fit therewith, and overlapping this sleeve while engaging the radial flange 67 is a hardened steel chrome-plated seal ring 70. Trapped in the space between the outer end of the sleeve 44, the flange 67, and the ring 70, is a second felt seal ring 71.

Snugly surrounding the cylindrical sleeve 44 of the hub flange 40, and expanding to maintain a constant pressural seal between this flange and the sealing ring 70, is a synthetic rubber seal ring 72 containing an expansive coil spring 73.

Surrounding the thrust sleeve 60 is a resilient rubber jacket 80 surfaced with a metal ferrule 81 and snugly received in an eye 82 of one of a pair of leaf springs 83 by which said bogie wheel construction 10 is mounted on the frame 12. Rubber blocks 85 may be interposed between the channel irons 13 and the eyes 82 to absorb sudden shocks to which the bogie wheel construction 10 is subjected.

The threaded recesses 63 are connected by a lubricant passage 86. This connects with a threaded passage 87 in the cap 61 which is provided with a check valved Zerk fitting 88 through which lubricant is adapted to be injected into the passage 86. The passage 86 connects through a hole 89 with the space 90 between the central portion 47 of the axle 46 and the wheel sleeve 32.

The cap 62 has a fluid vent 92 which connects with an inner recess 93 formed in said cap. The inner end of the threaded recess 63 into which this cap is screwed is enlarged to provide a lubricant reservoir chamber 94. Trapped between the cap 62 and the shoulder 95 at the outer end of the chamber 94 is the mouth flange 96 of a metal Sylphon 97. Disposed within the recess 93 is a filter screen 98. This screen is held in place and the Sylphon 97 expanded by a coiled expansive spring 99 disposed within the latter.

*Operation*

In order to lubricate the bogie wheel construction 10 a grease gun as applied to the Zerk fitting 88 and grease injected through this fitting which flows through the passage 86 and hole 89 filling the space around the bearings 36 and up to the felt rings 66 and 71 so as to impregnate these rings with lubricant. The excess of grease thus injected through the fitting 88 flows through the passage 86 into the lubricant reservoir 94 so as to compress the spring 99, as shown in Fig. 1, thereby establishing a reserve of lubricant in this reservoir which is under a constant pressure from the spring 99.

It is to be noted that this lubricant is also under atmospheric pressure entering through the opening 92 into the interior of the Sylphon 97. Thus the lubricant in the reservoir 94 and the system communicating therewith is at all times under the pressure of the atmosphere plus the pressure of the spring 99. At the same time it is also clear that the lubricant in the reservoir 94 is completely sealed off from any possible contact with the atmosphere or foreign matter carried thereby. It is also believed clear that the super-atmospheric pressure to which this lubricant is constantly subjected causes an imperceptible, but nevertheless constant, tendency of the lubricant to flow outwardly past the felt rings 66 and 71 and past the hardened metal seal ring 70 and the synthetic rubber seal ring 72.

This flow is so slight that a single charge of grease in the reservoir 94 will serve to lubricate the bogie wheel construction 10 without its being replenished for a very long period. It is also clear that the outward flow of lubricant from the bearings to and through the seals renders it impossible for any abrasives to pass inwardly through these lubricant seals and into the bearings.

Should the tank equipped with the bogie wheel construction 10 have to pass through water or stand with this construction submerged in water for a considerable period, there would be no danger of the admission of water into the bearing structure because the lubricant therein would at all times be subject not only to the pressure of the water but in addition thereto would be subjected to the pressure of the spring 99. While there is no perceivable flow of grease outwardly through the multiple lubricant seal of my invention when the bogie wheel 20 is not rotating, nevertheless the maintenance of the lubricant within the bearing, at all times under greater pressure than the air or water outside the bearing, renders it certain that neither air nor water, or any foreign matter carried thereby can pass inwardly through these seals when the bogie wheel 20 is not turning.

The modified form of my invention shown in Fig. 4 differs from the preferred form of the invention principally in providing a grease reservoir 110 in a bogie wheel axle 111 in which a relatively long reservoir bore 112 is formed in this axle, this bore connecting at its inner end with an outlet duct 113 and a lubricant inlet passage 114. Disposed in and slideably fitting the walls of the reservoir bore 112 is a piston 115 which is preferably formed of solid metal and has cup washers 116 at its opposite ends which are turned away from each other to keep any lubricant or dirt getting past the piston 115 when this travels in the bore 112.

Screwed into a suitable threaded counter bore provided in the outer end of the bore 112 is a plug 120 which is hollowed out and packed with filtering material 121. The plug 120 is perforated on its axis to permit air to pass therethrough, the material 121 straining all abrasives from this air. Trapped within the reservoir bore 112 between the piston 115 and the plug 120 is an expansion spring 130 which pressurally urges the piston 115 against any lubricant stored in the reservoir bore 112 on the left-hand side of the piston 115 as this is viewed in Fig. 4.

This pressure feeds this lubricant through the duct 113 to the bogie wheel 20 when the latter is mounted on the axle 111. The long bore 112 provides a larger lubricant reservoir than the reservoir 94. This increased capacity lengthens the time which a bogie wheel will be lubricated with a single servicing. When operating under excessive abrasive conditions the plug 120 can be removed and the bore 112 swabbed out just before each servicing so that the admission of any abrasives through the lubricant reservoir 110 to the bogie wheel bearings becomes practically an impossibility.

It is thus seen that I have produced a bogie wheel construction which is especially well adapted for performing the task imposed upon such wheels in military tanks and which reduces the necessity for servicing these wheels to an absolute minimum.

What I claim is:

1. A bogie wheel construction for military tanks comprising: an axle element; means for mounting said axle element on a tank; a bogie wheel element rotatable on said axle; bearing means between said elements; lubricant seal means forming annular seals in spaced planes between said elements outside of said bearing means; lubricant reservoir means on one of said elements, said means being connected to the space occupied by said bearing means; a diaphragm sealing off said reservoir means from the atmosphere and expansive during the normal operation of said element to substantially decrease the lubricant space in said reservoir means; and means for applying superatmospheric pressure continually through said diaphragm to lubricant in said reservoir means, tending to force said lubricant into said space and outwardly therefrom past said seal means.

2. A bogie wheel construction for military tanks comprising: an axle; means for mounting said axle on a tank; a bogie wheel rotatable on said axle; bearing means between said axle and wheel; lubricant seal means sealing off from the atmosphere the space between said axle and wheel containing said bearing means; lubricant reservoir means provided in said axle and connected to said space; a diaphragm sealing said reservoir means from the atmosphere and subjecting lubricant in said reservoir means to atmospheric pressure; spring means supplying an additive pressure through said diaphragm against said lubricant; and check valved means in said axle for replenishing lubricant in said reservoir means.

JAMES M. HAIT.